(12) United States Patent
Seader

(10) Patent No.: US 11,852,214 B2
(45) Date of Patent: Dec. 26, 2023

(54) SYSTEMS AND METHODS FOR A DUAL HOOK FLAT STRAP ATTACHMENT DEVICE

(71) Applicant: Nite Ize, Inc., Boulder, CO (US)

(72) Inventor: Rex Seader, Florissant, CO (US)

( * ) Notice: Subject to any disclaimer, the term of this patent is extended or adjusted under 35 U.S.C. 154(b) by 0 days.

(21) Appl. No.: 17/307,807

(22) Filed: May 4, 2021

(65) Prior Publication Data

US 2022/0356926 A1    Nov. 10, 2022

(51) Int. Cl.
*F16G 11/14* (2006.01)

(52) U.S. Cl.
CPC .................................. *F16G 11/143* (2013.01)

(58) Field of Classification Search
CPC ............... F16G 11/143; Y10T 24/3493; Y10T 24/4764; Y10T 24/4755
See application file for complete search history.

(56) References Cited

U.S. PATENT DOCUMENTS

| | | | |
|---|---|---|---|
| 397,136 A * | 2/1889 | McLean | F16B 45/06 |
| | | | 24/598.5 |
| 428,354 A | 5/1890 | Sant et al. | |
| 808,391 A * | 12/1905 | Lapsley et al. | F16B 45/06 |
| | | | 24/598.5 |
| 835,937 A | 11/1906 | Carlson | |
| 851,369 A * | 4/1907 | Nelsom | F16B 45/06 |
| | | | 24/598.5 |
| 2,637,089 A | 5/1953 | Kuehn et al. | |
| 4,891,961 A * | 1/1990 | Tsamas | A44B 15/00 |
| | | | 24/598.5 |
| 10,004,926 B2 * | 6/2018 | Ostrobrod | A62B 35/0068 |
| 2007/0056147 A1 * | 3/2007 | Tracy | F16B 45/00 |
| | | | 24/265 H |

FOREIGN PATENT DOCUMENTS

EP         3211255 A1 *  8/2017  ............. F16B 45/00

OTHER PUBLICATIONS

"Fastfender 32 Fender Hanger: Sold in Pairs" retrieved online on Jul. 22, 2021 at https://www.amazon.com/dp/B00NZCGAR2/ref=cm_sw_r_u_apa_glt_fabc_0F50Y8WKQYHCOMWQZXMK?_encoding=UTF8&th=1.
International Search Report and Written Opinion dated Jul. 7, 2022 issued in co-pending PCT App. No. PCT/US2022/071900 (8 pages).

\* cited by examiner

*Primary Examiner* — Robert Sandy
(74) *Attorney, Agent, or Firm* — Haynes and Boone, LLP

(57) ABSTRACT

An attachment device includes a first hook and a second hook, the first and second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook.

6 Claims, 14 Drawing Sheets

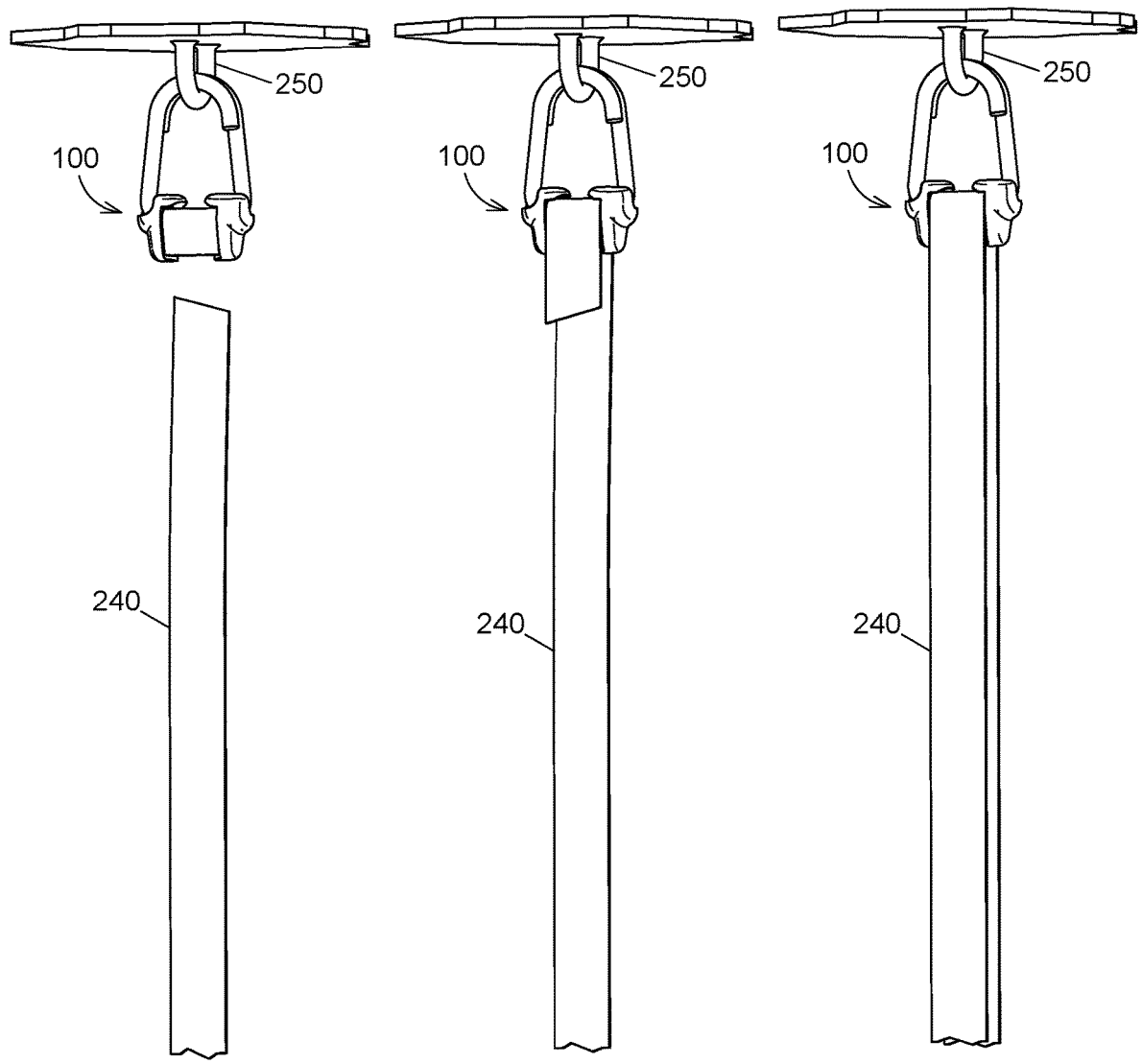

SYSTEMS AND METHODS FOR A DUAL HOOK FLAT STRAP ATTACHMENT DEVICE

BACKGROUND

Throughout this document 'fixed location', 'anchor location', and 'fixed anchor location' will be used interchangeably and are intended to convey the same meaning.

Strap tensioning devices are widely used and are available today in multiple designs, ratchet and camlocks devices being the most prevalent. Straps incorporated into these types of tensioning devices typically are terminated with hooks. Hooks, available in various shapes and sizes are used to secure the free end of a strap to a fixed anchor location.

The most commonly used hook design for strap termination, particularly on strap tensioning devices sized for use with 1" wide webbing, is what can be termed an 'S-hook'. The S-hook is an 'S' shaped hook where the lower end of the 'S' is closed and the upper end of the 'S' is open. The S-hook is permanently secured to one end of a strap by means of a sewn loop capturing the closed portion of the S-shaped hook 262 Prior Art (FIG. 15*a*). Thus, the strap will contain an 'S' shaped hook permanently affixed to the end of the strap, where the open end of the S-shaped hook can be removably attached to a fixed anchor location (FIG. 15*b*).

The majority of strap tensioning devices in the market place today, whether they are of the ratchet or camlock variety, utilize two straps, and are configured in what is typically referred to as fixed-end configurations. These being strap configurations where opposing ends of the two straps are removably secured to separate anchor locations. Typically, the strap tensioning device is positioned between the anchor locations, with one of the straps being permanently affixed to the tensioning device, the other strap being drawn through and held releasably secured in the tensioning device.

While the S-hook is the predominantly used means for securing strap ends to anchor locations, other means exist for securing strap ends. Two commonly used means are the 'J-hook' 264 Prior Art (FIG. 16*a*) and the carabiner 266 Prior Art (FIG. 19). Another method would be to simply use a loop sewn into the strap end 241 Prior Art (FIG. 17) without employing any type of hook, thus relying solely on the attachment of the sewn end loop directly to an anchor location (FIG. 18).

The J-hook consists of round wire stock formed into a triangular shape where the legs of the triangle at one of the three vertexes of the triangular shape have hooked shaped ends, turned perpendicular to the plane of the triangle. The curved hook portions resemble the curved bottom of the letter 'J'. The side of the triangular shape located opposite from the J-shaped hook ends, serves as the attachment location for the sewn-on strap. The primary difference between the S-hook and the J-hook is the orientation of the hook portion of each style of hook. For the S-hook, the hook portion aligns parallel with the plane defined by the flat area of the strap, whereas in a J-hook, the two hook-shaped wire-form ends are oriented perpendicular to the plane defined by the flat area of the strap.

With both styles of hook, it is not uncommon for the strap that is permanently secured to the tensioning device to also contain an additional loop of webbing 242 Prior Art (FIG. 15*c*), or a D-shaped metal ring 268 Prior Art (FIG. 16*c*), sewn to the strap and located close to where the strap is permanently attached to the tensioning device. By circumnavigating the anchor location with the S-hook (or J-hook) sewn to a strap end, and subsequently securing the hook portion of the S-hook (or J-hook) into the secondary smaller loop or D-ring, the strap can be removably secured to an anchor location much larger in size than what the S-hook (or J-hook) could directly accommodate (FIG. 15*c*, FIG. 16*c*).

In some instances, the sewn loop or D-ring is provided on the second strap rather than on the strap permanently attached to the tensioning device. Including a sewn loop or D-ring on this strap however, limits the minimum length the strap/tensioning device can be drawn to. If both straps contain the sewn loop or metal D-ring, this limitation becomes even more restrictive.

A carabiner styled hook 266 Prior Art (FIG. 19), used for strap attachment functions similar to both the S-hook and the J-hook, with the additional feature of providing a more secure means in removably securing the strap end to an anchor location. A carabiner styled hook typically contains a lock gate, fabricated as either a wire-form spring gate, or as a spring biased pivoting member made from the same material as the hook itself. In either case, the locking member of the carabiner, spring biased to a closed position, can be rotated open to allow attachment of the hook to an anchor location. The spring force biasing the movable member to a closed position rotates or pivots the open member back to the closed position once the carabiner is secured to the anchor location.

While a carabiner style hook provides means for anchor attachment that is more secure than an S-hook, a carabiner style hook lacks the anchor capacity of an equivalently sized S-hook. Anchor capacity being the largest diameter anchor to which the carabiner can be attached. The primary reason for this is the space required for the rotation of the lock gate consumes a significant amount of volume within the footprint of the carabiner (FIG. 19).

Additionally, a carabiner is vulnerable structurally if loading is applied such that that the carabiner experiences a severe twisting action along the length of the carabiner body, or if side loading is applied directly to the moveable gate. While the movable lock gate of the carabiner is typically designed to accommodate large tensile loading along the length of the carabiner, the c-shape of the carabiner body, paired with the locking member, are not typically designed to accommodate large torque loads or side loading.

Webbing has a rectangular cross section, much wider than it is thick. Contrast this with rope, which has a circular cross section. When highly tensioned webbing is routed through a carabiner, the carabiner can experience a disproportionate twisting action along the long axis of the carabiner, particularly so if the anchor location prevents the carabiner from rotating to equalize the twisting action induced by the webbing. Thus, the asymmetrical design of a carabiner makes it vulnerable to damage from non-tensile loading, more so when it is paired with webbing than when it is paired with round cross-sectioned rope.

The draw back to the open-end S and J hooks is the open-end hook. Apart from the induced tension applied to the strap by means of the tensioning device, nothing is really holding the hook securely to the anchor location. The open-end hook can inadvertently disengage from the anchor location if it is improperly positioned with respect to the anchor, or if slack conditions exist in the webbing.

Finally, it is worth mentioning that most S-hooks are fabricated with a conformal coating applied to the hook. While this is perceived as a distinct advantage for protecting the surfaces of anchor locations, it also precludes the possibility of allowing the strap to move through the closed portion of the S-hook without doing damage to either the conformal coating applied to the hook or to the webbing. For a strap that is permanently secured to the hook, this would not be considered a liability. However, for applications where it would be desirable for the webbing to move through the closed portion of the hook, this becomes a distinct liability.

BRIEF SUMMARY

The embodiments described herein enable a removably secure attachment between a strap end containing a sewn end loop and a fixed anchor location. Additionally, the embodiments can be selectively attached to, or removed from, the sewn end loop in the strap. Thus, when said straps are used with strap tensioning devices, the user is afforded an option to include or remove the embodiment from the strap configuration.

Unlike S-hooks and J-hooks that are permanently attached to the strap ends, the embodiments can be selectively added to or removed from an existing sewn loop in a strap end, thus matching the convenience of a gated carabiner.

Additionally, while providing the means for an effective, closed-loop anchor attachment, the embodiments match the larger anchor capacity and physical robustness in construction of the more conventional and widely used open style S-hooks and J-hooks—without incurring the structural vulnerability of a gated carabiner.

Another, and perhaps less obvious aspect of the embodiments described herein, is the commonality in appearance with the generic S-hook. While serving the equivalent function of the S-hook, the user will immediately recognize the familiarity in design and use, while also recognizing the additional security incorporated into the embodiment attachment scheme.

The embodiments described herein also offer a means for secure anchor attachment when the strap is routed around a large diameter anchor location that requires the embodiment to reengage with the strap itself rather than with the fixed anchor. This is accomplished without incorporating either an additional loop or D-ring into the strap, and without risking disengagement of the embodiment from the strap when the strap is in a slack condition. Additionally, the structural integrity and load bearing capacity of the embodiment will not be compromised when configured in this manner.

Additionally, the embodiments can be configured to function as static pulleys, allowing a strap undergoing tensioning to contact and move past the load bearing surfaces of the embodiments without compromising either the strap or the embodiment surfaces.

In one embodiment, an attachment device includes a first hook and a second hook, the first and second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook. In one alternative, the first and second hook rotate between the first and second position. Alternatively, the attachment device further includes a housing, the housing interconnecting the first and second hook and providing a mechanism for a biasing force, the biasing force biasing the first and second hook towards each other. In another alternative, the attachment device further includes a first spring located in the housing, the first spring providing the biasing force. In another alternative, the attachment device further includes a center wall, the center wall located in the housing, the first spring pressing against the housing and the first hook in order to bias the first hook. In another alternative, the attachment device further includes a second spring located in the housing, the second spring pressing against the housing and the second hook in order to bias the second hook. Alternatively, the first hook has a first opening and the second hook has a second opening and the first hook has a straight base and the second hook has a straight base. In another alternative, the first and second hook lie flat against each other in the second position, such that first curved end is aligned with the second curved end and the first opening is open in an opposite direction from the second opening. Alternatively, a portion of each of the first and second hook have a j-shape and in the second position the first and second hook lie flat on each other such that the j-shape of the first hook is superimposed over the j-shape of the second hook and the first opening is open in an opposite direction from the second opening. In another alternative, the housing includes a gap, the gap sized for receiving and securing a flat strap. Alternatively, the first hook includes a first bottom leg, the first bottom leg in the housing and the second hook includes a second bottom leg, the second bottom leg in the housing. In another alternative, the first and second bottom leg are each a straight leg that opposes the first and second curved end respectively. Alternatively, the first bottom leg includes a first central swage, the first central swage oriented to press against the first spring to create the biasing force respective to the first hook. In another alternative, the second bottom leg includes a second central swage, the second central swage oriented to press against the second spring to create the biasing force respective to the second hook. Alternatively, the first and second spring are flat springs. In another alternative, the first bottom leg includes a third swage and the second bottom leg includes a fourth swage, the third swage in a first notch in the housing, the first notch limiting the rotation of the first hook and the fourth swage in a second notch in the housing, the second notch limiting the rotation of the second hook. Alternatively, the first and second hook rotate about the first and second bottom leg respectively between the first and second position.

In one embodiment, an attachment apparatus includes a first hook and a second hook, the first and second hook, the first and second hook biased towards each other and interconnected with each other, such the first and second hook have a first position, where a first curved end of the first hook is separated from a second curved end of the second hook and a second position, where a portion of each of the first and second hook have a j-shape and in the second position the first and second hook lie flat on each other such that the j-shape of the first hook is superimposed over the j-shape of the second hook and a first opening is open in an opposite direction from a second opening. In one alternative, the first hook has a straight base and the second hook has a straight base.

In one embodiment, a method of operating an attachment device includes providing an attachment device including a first hook and a second hook, the first and second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook. The method further includes pushing the first and second curved end, in the second position, against a connection point. The method further includes flexing the first and second curved end into the first position via the pushing. The method further includes twisting the attachment device to release return the first and second hook to the second position. Alternatively, the method includes the first hook has a first opening and the second hook has a second opening and the first hook has a straight base and the second hook has a straight base and a portion of each of the first and second hook have a j-shape and in the second position the first and second hook lie flat on each other such that the j-shape of the first hook is superimposed over the j-shape of the second hook and the first opening is open in an opposite direction from the second opening.

BRIEF DESCRIPTION OF THE DRAWINGS

FIGS. 10a-10c show a sequence of isometric views depicting a step wise progression attaching a strap to the attachment device of FIG. 1, while secured to a loop style fixed anchor, with the configuration capable of accommodating a high amount of tension during the insertion of the strap without adversely effecting either the strap or the attachment device;

FIG. 12a, FIG. 12b, FIG. 12c show isometric views depicting an alternative embodiment of an attachment device where two flat springs from the attachment device are replaced with a single U-shaped spring, and the position of both hooks in the attachment device are influenced by the U-shaped spring, with FIG. 12b is a cut away view of FIG. 12a;

FIG. 13a, FIG. 13b, FIG. 13c show isometric views depicting an alternative embodiment where two flat springs from the attachment device are replaced with a single torsion spring, and the position of both hooks in the embodiment are influenced by the torsion spring, with FIG. 13b is a cut away view of FIG. 13a;

DETAILED DESCRIPTION

Figure 1:
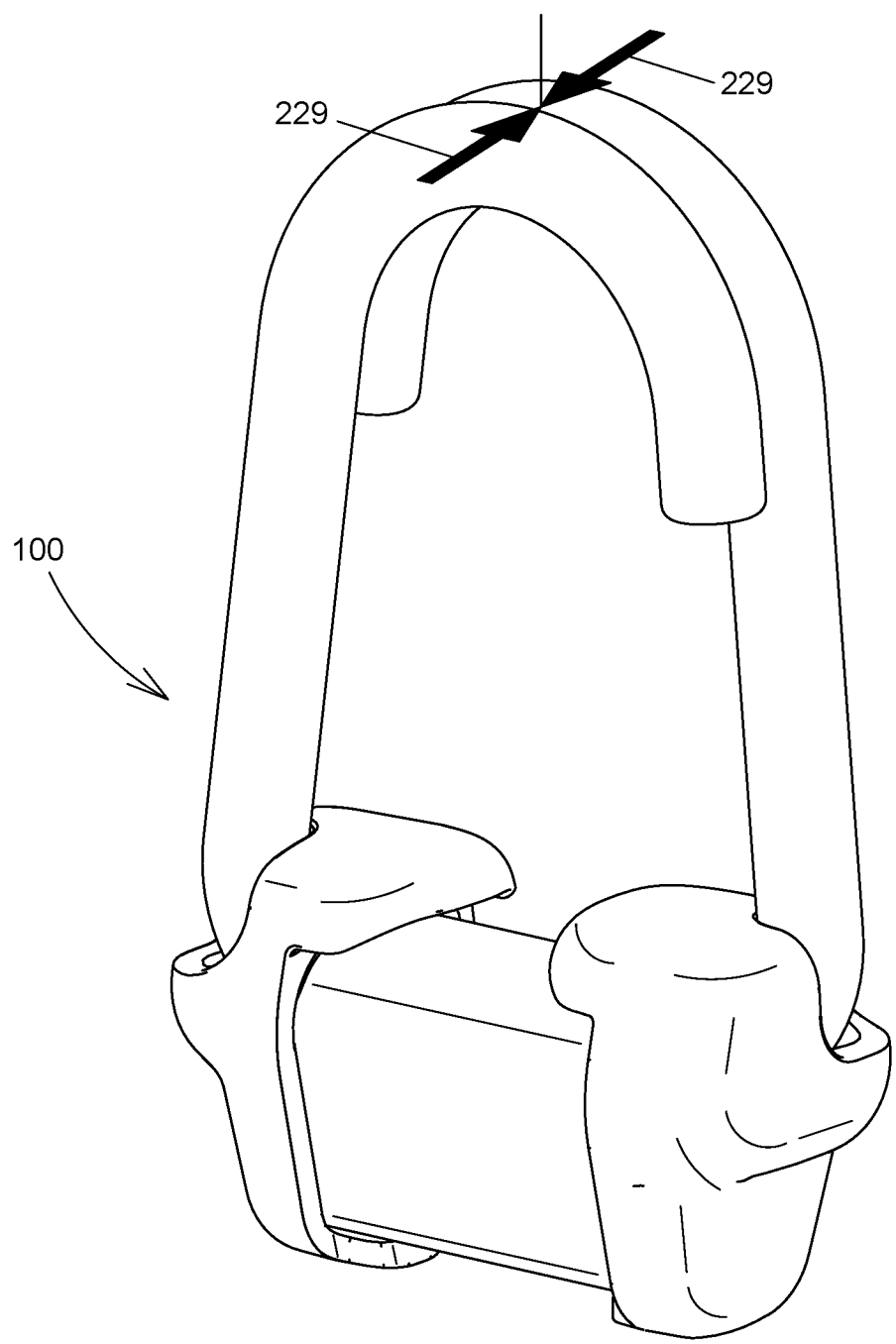
FIG. 1 shows an isometric view of one embodiment of an attachment device 100, hooks closed.
Figure 2:
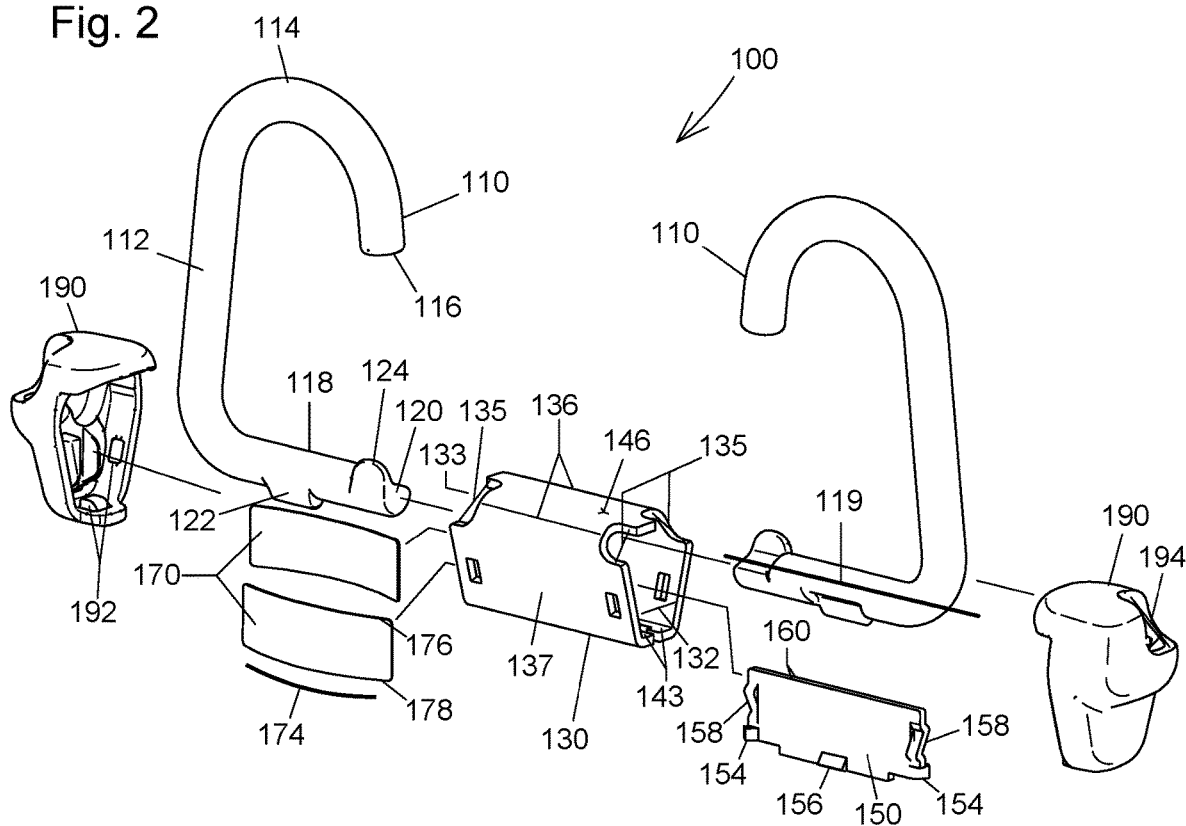
FIG. 2 shows an exploded isometric view of the attachment device of FIG. 1.
Figure 3:
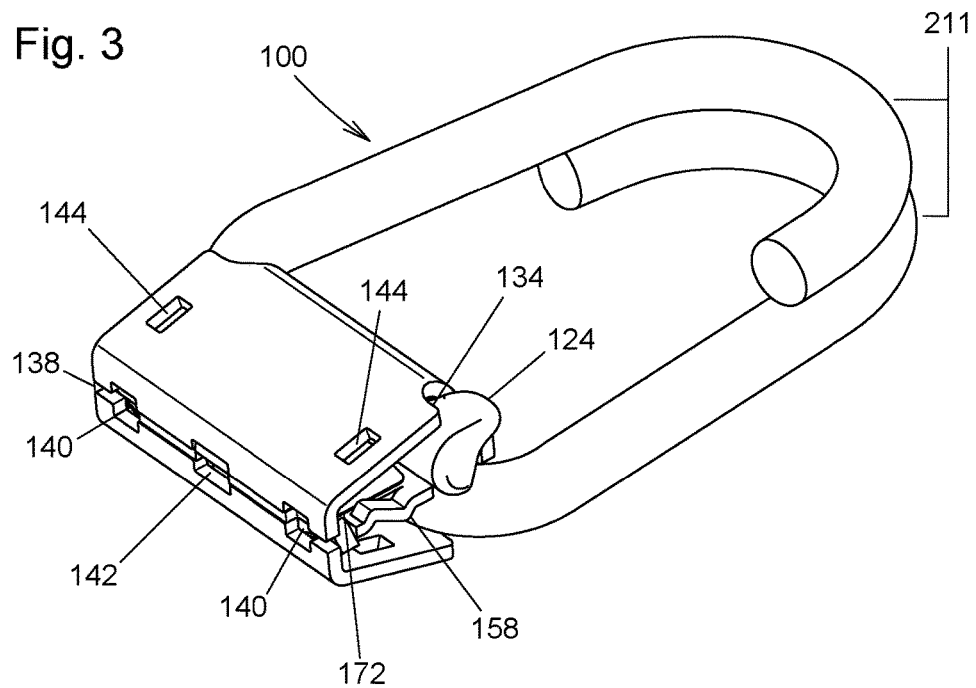
FIG. 3 shows an isometric view of the attachment device of FIG. 1, hooks closed, end caps not shown.
Figure 4:
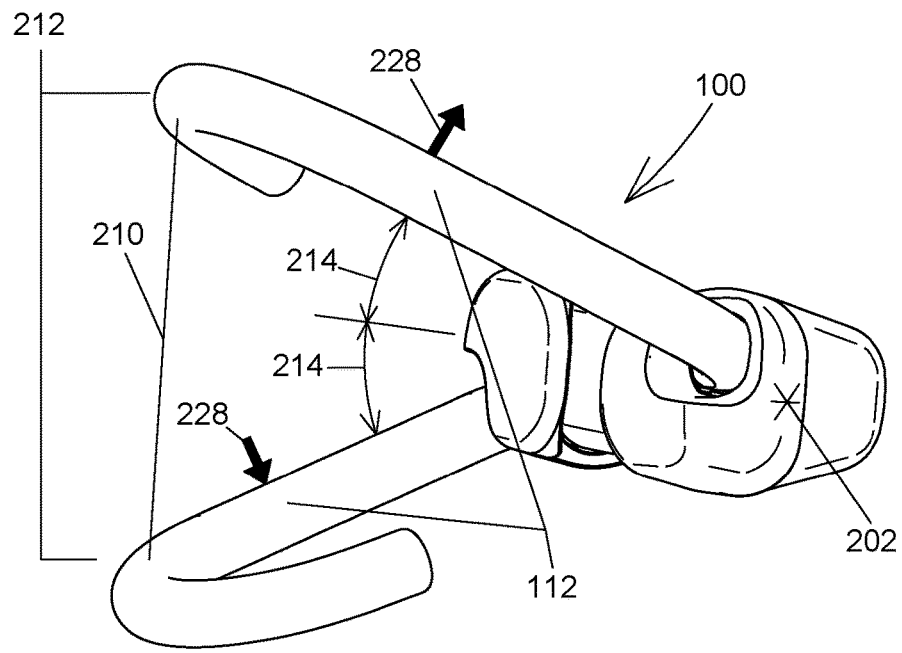
FIG. 4 shows an isometric view of the attachment device of FIG. 1, hooks open.

Drawing Reference Numerals 100 a preferred embodiment, attachment device
110 hook
112 hook stem
114 hook apex
116 hook end
118 hook bottom leg
119 axis defined by the hook bottom leg
120 hook bottom leg end
122 hook bottom leg center swage
124 hook bottom leg end swage
130 housing
132 first end opening
133 second end opening
134 edge
135 housing cutout
136 housing fold radius
137 housing side wall
138 housing bottom gap
140 housing bottom end void
142 housing bottom center void
143 inside surface of housing bottom
144 rectangular opening
146 housing top surface
150 center wall
154 center wall bottom edge end tab
156 center wall bottom edge middle tab
158 center wall side edge semi-pierce
160 center wall top edge
170 flat spring
172 flat spring end
174 flat spring preformed curvature
176 flat spring top edge
178 flat spring bottom edge
190 end cap
192 end cap protrusion
194 end cap opening
196 gap, end cap to housing
198 overhang, end cap
200 gap, between end caps 202 finger grip area, end cap
210 gap, between open hooks
211 hooks, closed position
212 hooks, open position
214 hook rotation
215 area between end caps and closed hooks
228 motive force
229 force direction
230 force direction
232 center axis
240 strap
241 prior art, sewn-loop at the end of a strap
242 prior art, sewn-loop along a strap
250 anchor location, welded loop
251 anchor location, round bar section
252 anchor location, large diameter
260 prior art, single strap generic camlock device
262 prior art, S-hook strap
264 prior art, J-hook strap
266 prior art, carabiner
268 prior art, D-shaped ring
400 alternative embodiment
401 U-shaped spring
402 center wall
500 alternative embodiment
501 torsion spring
502 center wall Certain terminology is used herein for convenience only and is not to be taken as a limitation on the embodiments of the systems and methods for a dual hook flat strap attachment device (referred to commonly as an attachment device). In many embodiments, the attachment device includes two hooks that are biased towards each other. The hooks move in a rotational direction away from each other, initially tangent to the plane of the hook. The hooks are biased towards each other via a flat spring system, where the base of each hook presses against a spring braced by a central portion. This mechanism may be contained in a central body or housing. In some alternatives, the central portion maybe omitted, and a single spring may be positioned in a central portion of a housing. In some embodiments, a double-sided folded flat spring may be used.

FIG. 1 through FIG. 5. The attachment device 100 (an example of a preferred embodiment) is comprised of five unique parts, three of the parts are used twice in the embodiment. Thus, where two flat springs are used the attachment device 100 includes eight parts in total.

The parts are referenced as: hook 110 (quantity 2), housing 130, center wall 150, flat-spring 170 (quantity 2), and end cap 190 (quantity 2).

The housing 130 serves as a foundation part of the attachment device 100. In many configurations, the other parts that make up the attachment device, interface with, and are constrained by, the housing in some manner. The hook 110 is c-shaped, the bottom leg 118 of the hook is straight and contains two swage details, the bottom leg center swage 122, and the bottom leg end swage 124. Various alternative shapes may be used for the hook. In many scenarios, it is important to include the bottom straight leg of the hook to provide for rotation of the hooks, however, even here alternatives are possible. Additionally, although the swage is used in many scenarios, the idea of the swage is to provide a mechanism for the spring to press against in order to provide rotational force. Many alternatives are possible for the swage detail, including but not limited to, a pin or peg passing though the leg for the spring to push on, a cutout or other modification of shape of the leg, a bend in the leg, or a variety of other configurations. Two hooks 110 are constrained within the housing, held in opposition to each other, and in contact with each other when in a closed position 211. The center wall 150 is positioned lengthwise within the housing, held in position by the housing bottom gap 138, and by multiple interlocking details 154, 156 incorporated into the bottom edge of center wall. The top edges 160 of the center wall 150 assist in holding the hooks 110 in position within the housing 130. The flat spring 170 is rectangular in shape, preformed into a curve, the curve oriented along the length of the part. Two flat springs 170 are utilized in the attachment device 100, and are positioned on opposite sides of the center wall 150. The flat springs 170 provide the motive force that normally biases the two hooks 110 to maintain a closed position 211. Finally, two end caps 190 press fit onto the open ends 132, 133 of the housing 130, providing ancillary protection in case of any contact events, and to enhance the cosmetic appearance of the attachment device 100. The end caps 190 also encapsulate the lower portions of the hooks 110 without inhibiting rotational displacement of said hooks. In some embodiments, the flat springs may be replaced by coiled springs. In alternatives, the center wall may be removed and simply a coil spring may be used or a double-sided folded flat spring. Although in the various embodiments shown, curved hooks are shown, the ends of the hooks need not be curved and may be squared, triangular, or take some other shape. The point of the hooks is to have an area that may overlap with the other hook when the two are aligned and a hook stem on either side. Furthermore, the housings on either end may be modified to take other forms or omitted. In many embodiments, the device includes a housing having side walls and a mechanism to retain the bottom leg of the hooks in the housing such that they may press against the spring or springs and therefore be biased towards each other.

To assemble the attachment device 100, each hook 110 slides into the housing 130 from opposing ends 132, 133 of the housing. The center wall 150 then slides into the housing 130, holding the hooks 110 in position. A top edge 160 of the center wall presses into the hook leg 118 on each hook 110, holding the hook legs in concentric orientations with respect to the fold radii 136 formed between the housing top surface 146 and the housing side walls 137. The swage 124 located at the end 120 of the hook bottom leg 118 is constrained by a cut-out 135 in each end opening 132, 133 of the housing 130. The cut-out 135 in each end opening 132, 133, in conjunction with the top edges 160 of the center wall prevent the hooks from being dislodged from the housing whenever force oriented outwards 230 is applied to either hook stem 112. The center wall 150 is held captive, end-to-end with respect to the housing, by the means of an interlocking action between the center wall bottom edge middle tab 156 and the housing bottom center void 142. Center wall bottom edge end tabs 154 press against the inside surface of the housing bottom 143, while concurrently, the top edges 160 of the center wall press against each respective hook leg 118 to hold the center wall 150 in position, top-to-bottom with respect to the housing 130. Insertion of the center wall into the housing will cause the housing sidewalls 137 to momentarily spread apart with respect to each other until the center wall 150 moves to its final position. Upon the correct positioning of the center wall 150, the housing side walls 137 will spring back to their original position, holding the center wall in the position described above.

A first flat spring 170 slides into the housing 130 through one of the end openings 132, 133 such that the top edge 176 of the flat spring presses against the hook leg center swage 122 while each end 172 of the flat spring presses against the center wall 150, resulting in the hook leg center swage being pressed outward away from the center wall. The bottom edge 178 of the flat spring presses into the fold formed between the housing side wall 137 and the inside surface of the housing bottom 143. The flat spring 170 slides into the housing 130 until each end 172 of the flat spring is bounded by an interior surface of the semi-pierces 158 located on the ends of the center wall.

A second flat spring 170 slides into the housing 130 through one of the end openings 132, 133 on the side of the center wall 150 opposite from the first flat spring 170, in a manner similar to that of the first flat spring. When both flat springs 170 are properly positioned, the apex 114 on each hook 110 will press inward 229 (FIG. 1) forcing the hooks into contact with each other, thus biasing the hooks to a closed position 211.

The flat spring 170 is fabricated from flat sheet spring steel—hence its designation as a flat spring. However, upon fabrication, the flat spring is preformed into a curved shape 174. The magnitude of force pressing the two hooks together can be specifically tuned by varying the amount of preformed curvature 174 and/or the thickness of the material used to fabricate the flat spring 170. Increasing the amount of preformed curvature 174, or increasing the material thickness of the flat spring will increase the force with which each hook presses against the other. Additionally, varying the length, thickness, or material the spring is formed out of may vary the strength.

Each hook 110 can be independently rotated 214, outward away from its contact point with the other hook, to an open position 212 by applying a motive force 228 to the hook stem 112. Hook rotation 214 occurs about the axis 119 defined by the hook's bottom leg 118. Edges 134, formed by cutouts 135 in the housing 130, limit the rotational travel of each hook 110. Each hook 110, independent of the other, will return to a closed position 211 whenever the motive force 228 holding the hook open is removed from that hook's hook stem 112.

End caps 190 are attached to the housing 130 by placing the opening 194 in the end cap onto the hook end 116 of each hook 110. The end caps 190 are then pushed onto the hooks 110, moving around the curved portion of the hooks until the end caps are brought into position facing the end openings 132, 133 of the housing 130. The end caps are pressed into place on the housing. Protrusions 192 located on the interior walls of the end caps 190 engage with rectangular openings 144 in the housing sidewalls 137 and with the voids 140 present on the bottom of the housing. Once the protrusions 192 on each end cap 190 fully engage with the openings 144 in the housing side walls 137 and the housing bottom 140, the end caps lock into place. In some configurations, like the one presently discussed, the end caps cannot be removed from the housing 130 without causing irreparable damage to the end caps.

While not an integral aspect of the structural integrity of the attachment device 100, each end cap 190 will also aid in holding the housing sidewalls 137 in position, thus aid in holding the center wall 150 in position, thus aid in holding the hooks 110 in position.

The end caps 190 serve multiple functions. The end caps provide a cosmetic finish to the attachment device while simultaneously preventing the attachment device from damaging other objects the embodiment may come into contact with. Additionally, the end caps help to keep debris and other objects from entering the housing 130, thus ensuring the proper operation of the hooks. Finally, the end caps provide a location 202 for the user to grasp the attachment device when securing the embodiment to a strap, or when attaching the embodiment to an anchor location, or when removing the embodiment from an anchor location.

The flat spring 170 is to be fabricated from flat spring steel and formed accordingly. The housing 130 and the center wall 150 can readily be stamped from steel sheet and die formed/die pierced to their respective shapes. The hooks 110 likewise could be fabricated from steel, either shaped directly from round stock, or blanked and forged. The materials utilized in the fabrication of any of the individual parts will be based on the performance levels required for a particular implementation of the attachment device 100.

Typical load bearing requirements of current tensioning devices used in the market place today would favor the use of steel materials as described above. However, for applications not requiring the performance levels that steel materials enable, materials such as aluminum or even molded thermoplastics could provide the same functionality for the attachment device 100.

The end cap 190 is ideally suited for fabrication utilizing a molding process, and can be molded from a variety of suitable thermoplastic materials or other materials, including, but not limited to, plastics, metal, and wood.

Operation:

Many embodiments of the attachment device 100 can be used with and are sized for 1" wide webbing or strap, in a thickness range inclusive of common commercially available webbing selections. Many embodiments of the attachment device accommodate standard 1" wide tubular webbing as well. Additionally, the attachment device could be scaled in size to accommodate webbing widths both wider than 1" and narrower than 1". Also note that any reference to 1" wide webbing is generic in nature as commercially available 1" webbing can vary plus or minus a tenth of an inch or more.

Figure 7A:
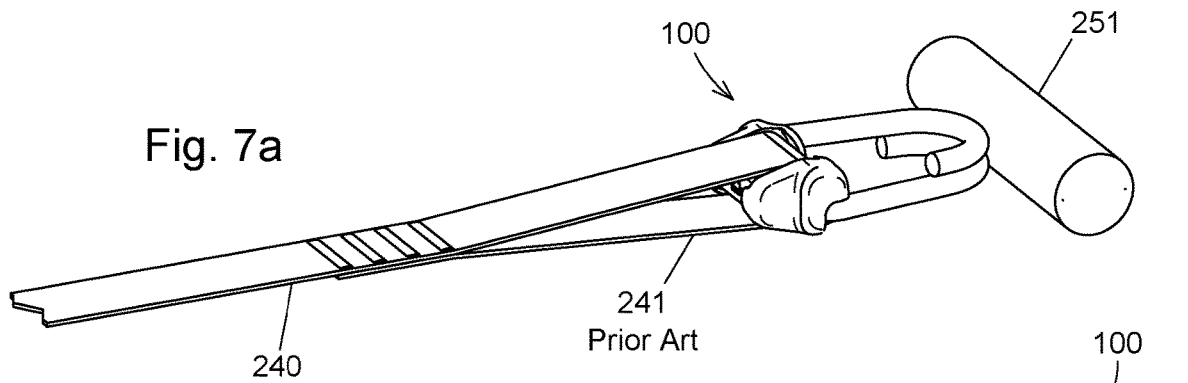
FIGS. 7a-7d shows a sequence of isometric views depicting a step wise progression of the attachment device of FIG. 1 connecting to a section of round bar, with the attachment device secured to a loop sewn at the end of a strap.
Figure 7B:
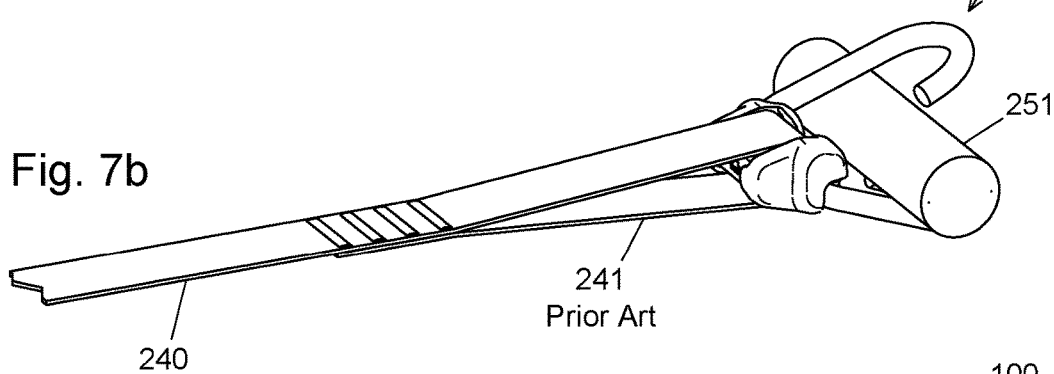
Figure 7C:
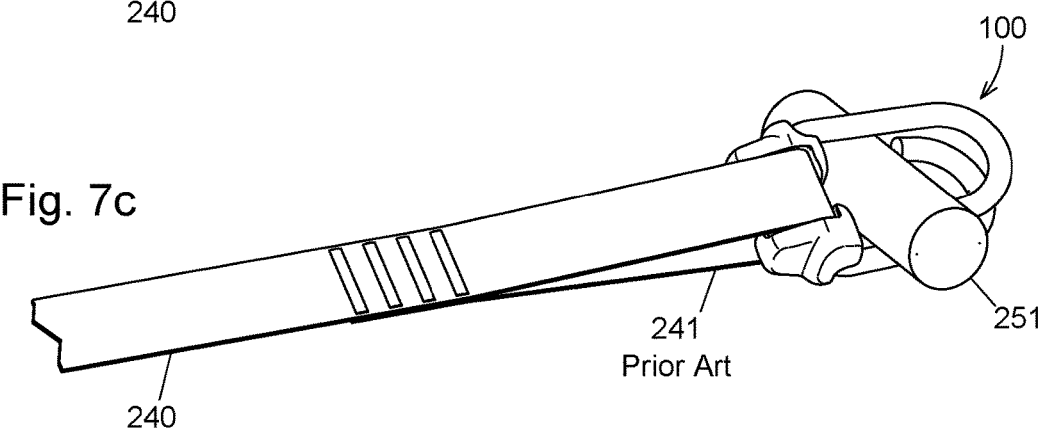

The attachment device 100 is a spring-biased device utilized to secure the sewn end-loop of a strap 241 to a fixed anchor point 250, 251. Two springs 170 located internal to the housing 130 bias two identical hooks 110 toward a closed position 211. The user (or the actual specifics of the anchor location) induce the two hooks 110, set in opposition to each other, to open or spread apart as the hooks engage with the anchor location 250, 251. Upon attachment to the anchor, the opposing hooks move back to their original closed position, creating a removably secure attachment between the strap-loop 241 and the fixed anchor location 250, 251 (FIG. 7a though FIG. 7d, FIG. 8a through FIG. 8d). Note, the removably secure attachment exists independent of the strap remaining in a slack condition or undergoing tensioning by means of a tensioning device.

Figure 14:
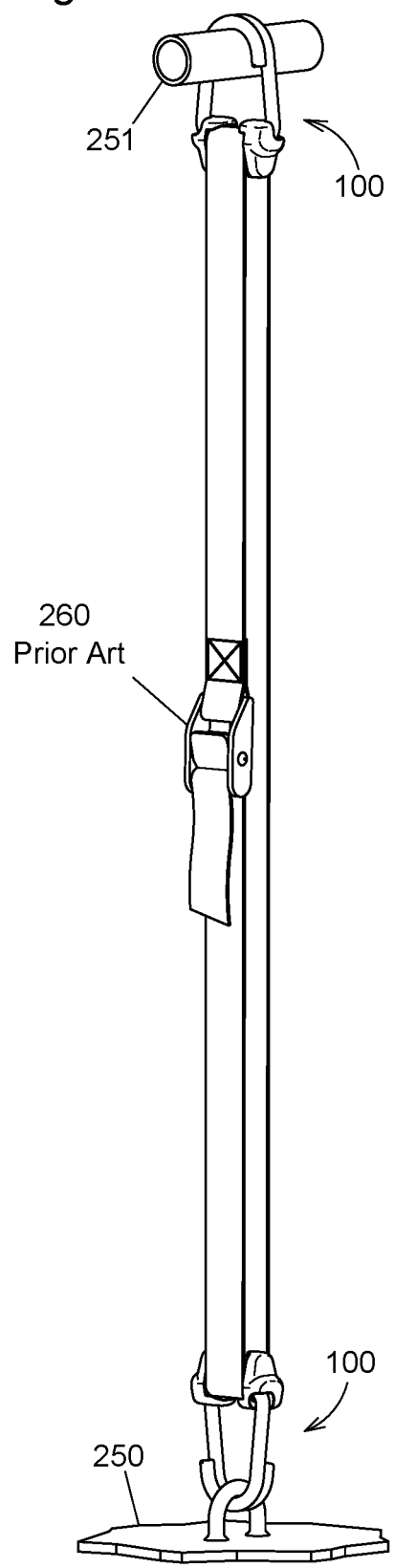
FIG. 14 shows an isometric view depicting a Prior Art single strap camlock device arranged in a fixed-end configuration that utilizes two attachment devices like those in FIG. 1, to releasably secure the strap to fixed anchor locations.

Attachment of the attachment device 100 to the strap loop 241 is accomplished by spreading the opposing hooks 110 far enough apart to allow insertion of the strap loop into the gap 210 created between the separated hooks. The strap loop 241 is then moved towards the gap 200 existing between the two end cap overhangs 198. A simple thumb pinch of the strap allows the user to insert the strap edges into the gaps 196 that exist between the housing 130 and the end cap overhangs 198 (FIG. 5, FIG. 6a through FIG. 6d). Note, that in FIGS. 6a-9d and 11a-11d the Prior Art callout refers only to the loop end (strap loop 241) specifically. In FIG. 14, the Prior Art callout refers only to the camlock device 260 specifically.

The attachment device 100 can be removably secured to a strap 240 whenever the strap contains a loop 241, 242 of sufficient size to allow insertion of the housing 130 (with attached end cap 190) into the loop. Typically, the loop 241 is located at the end of the strap. However, a loop 242 positioned anywhere along its length would suffice just as well (FIG. 11*a* through FIG. 11*d*).

Figure 18:
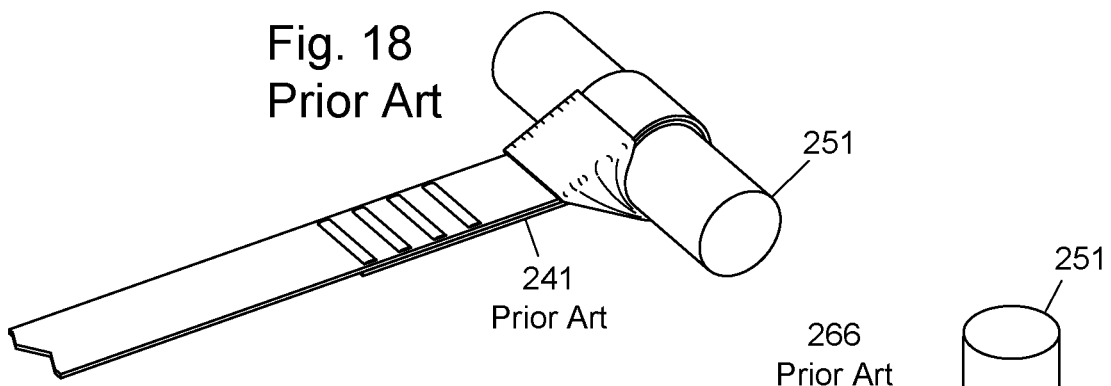
FIG. 18 Prior Art, shows an isometric view depicting the loop sewn at the end of a strap from FIG. 17 secured to a round bar section using a cow hitch knot.

Thus, the user can directly attach a strap loop 241 to a primary anchor location 251 (FIG. 18), or secure the strap loop 241 to the attachment device 100 (FIG. 6*a* through FIG. 6*d*), and then secure the attachment device 100 to the primary anchor location 250, 251 (FIG. 7*a* through FIG. 7*d*, FIG. 8*a* through FIG. 8*d*).

Figure 5:
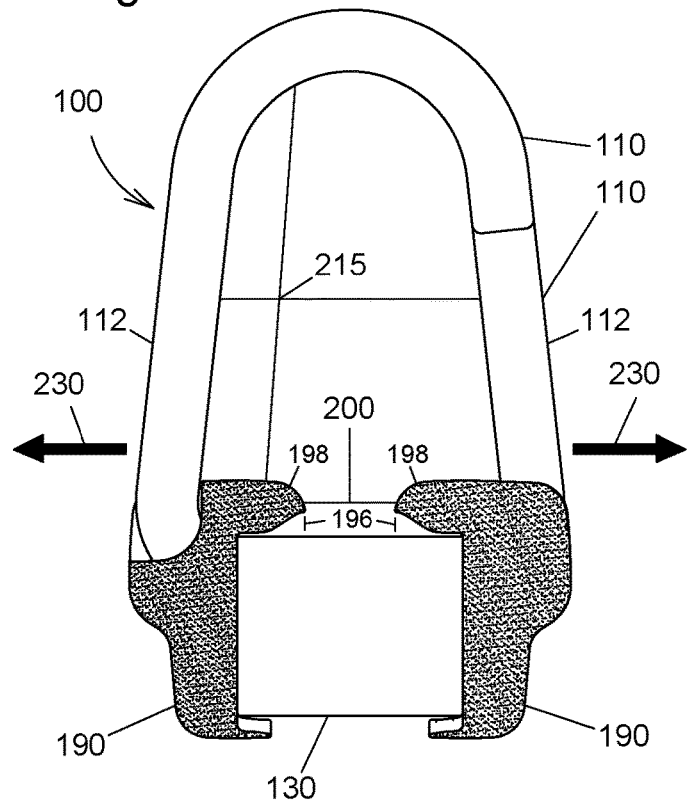
FIG. 5 shows a front view of the attachment device of FIG. 1, hooks closed.
Figure 6A:
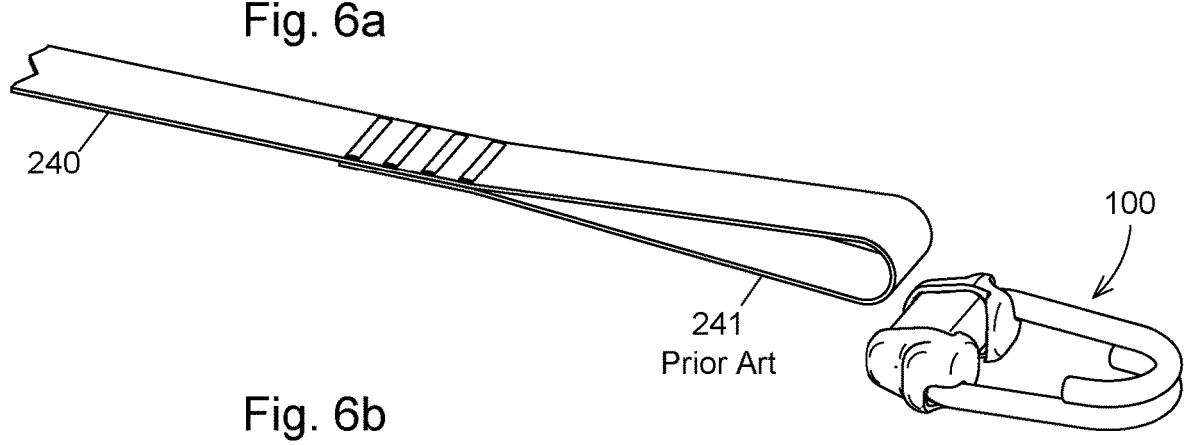
FIGS. 6a-6d shows a sequence of isometric views depicting a step wise progression attaching a sewn end loop to the attachment device of FIG. 1.
Figure 6B:
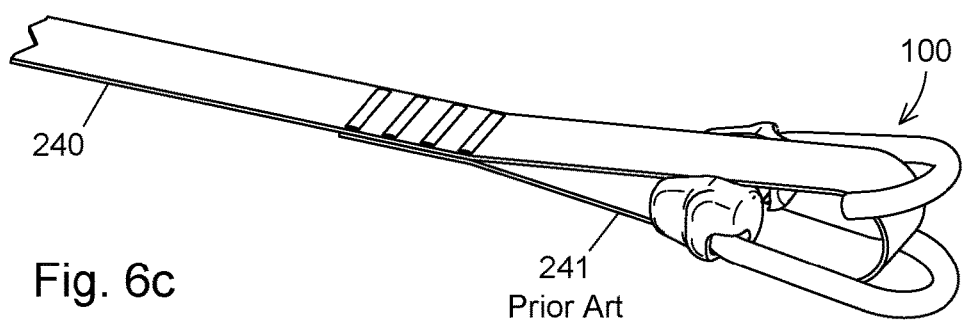
Figure 6C:
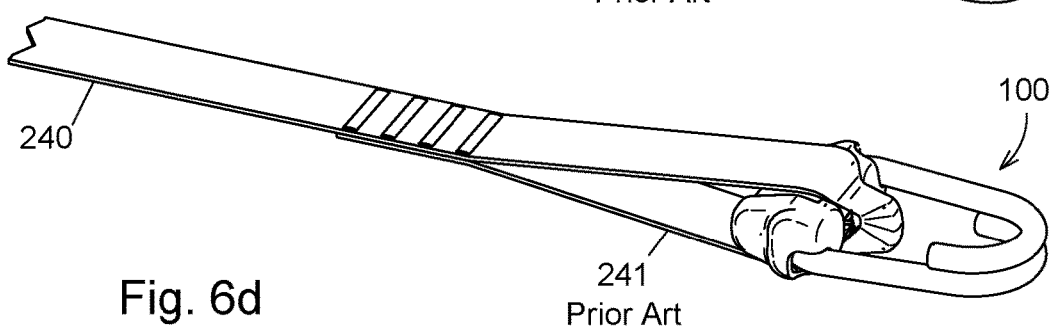
Figure 6D:
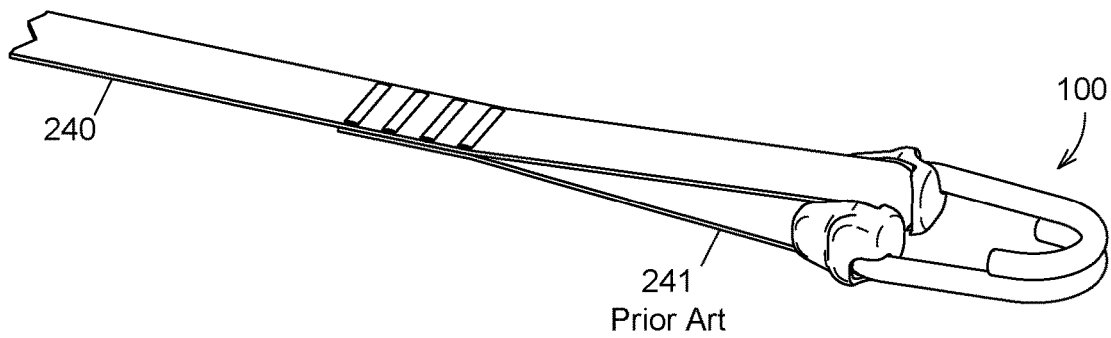

Upon insertion of the strap loop 241 into the gaps 196 between each end cap overhang 198 and the housing 130, the strap is essentially segregated from the hooks 110 and from the open area 215 existing between the two end cap overhangs 198 and the overlapping hooks 110. This protects the strap from inadvertent damage by isolating the strap from the fixed anchor to which the attachment device 100 is secured (FIG. 5).

The action of attaching the attachment device 100 to an anchor location varies depending upon the specific attributes of the anchor location 250, 251, 252. (FIGS. 7*a*-7*d*, FIGS. 8*a*-8*d*, FIGS. 9*a*-9*d*). For the most part, the attachment (and removal) of the attachment device 100 to most anchor locations is magic-trick-fast, equally matching the convenience of the open-end S-hook.

For example, FIG. 7*a* through FIG. 7*d* illustrates the action of attaching the attachment device 100 to a section of round bar 251. Simply pressing the attachment device 100 against the round bar 251 will cause the bar to begin to separate the two hooks 110 of the attachment device 100. As the attachment device is pressed further onto the bar, the hooks separate further and begin to surround the bar. Rotating the attachment device approximately 90° clockwise throughout this action will allow the two hooks to return to a closed position 211 thus completely encircling the round bar, creating a secure attachment between the attachment device and the round bar.

To release the attachment device 100 from the round bar 251, the action is reversed. The user initiates a 90° rotation of the attachment device counter-clockwise to move the hooks to an open position 212. Simultaneously, the attachment device is pulled away from the round bar and the attachment device 100 will disengage from the round bar 251.

The requirement of having to execute a compound action of pressing and rotating (to attach) or rotating and pulling (to detach) creates the secure and reliable connection. Simply pulling on the attachment device, or pulling on the strap to which the attachment device is attached, will not enable the attachment device to be detached from a fixed anchor.

Another example, FIG. 8*a* through FIG. 8*d*, illustrates the action of attaching the attachment device 100 to a metal loop 250. The process is similar to the previous example but requires slight adjustments in the action. Rather than rotating the embodiment approximately 90° along the length of the embodiment, the rotation needs to occur through the center axis 232 of the circular end portion of the hooks.

The execution of the action can be simplified further by combining the rotation action of the previous example with the rotation described is this example. The action becomes quite intuitive such that the user quickly learns how execute attachment and detachment in simple continuous movements.

The key aspect in this remains the action of executing an attachment of the attachment device to an anchor location, or the action of executing the detachment of the preferred embodiment from an anchor location requires a compounding of multiple actions such that each action in isolation will not be sufficient to disengage the attachment device from a fixed anchor. Hence, the attachment of the attachment device 100 to a fixed anchor, results in a releasably secure attachment.

Furthermore, as long as tension is present in the strap while the attachment device 100 is secured to a fixed anchor, the detachment of the attachment device 100 from the fixed anchor 250, 251, 252 cannot be executed without first removing (or overpowering) the tension in the strap.

Figure 15A:
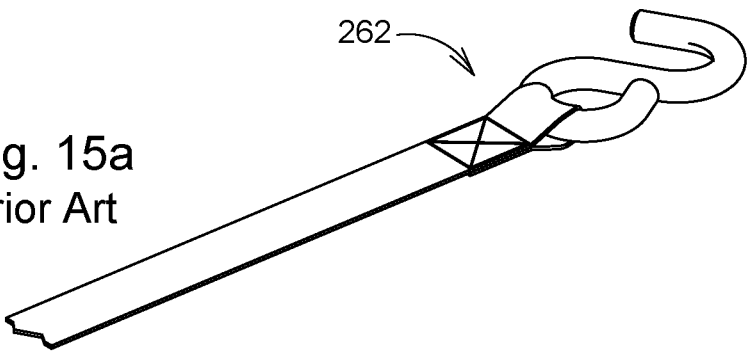
FIGS. 15a-15c Prior Art, show isometric views depicting an S-Hook strap, an S-Hook strap with the S-hook secured to a round bar section, and an S-Hook strap with the S-hook secured to a loop sewn onto the strap.
Figure 15B:
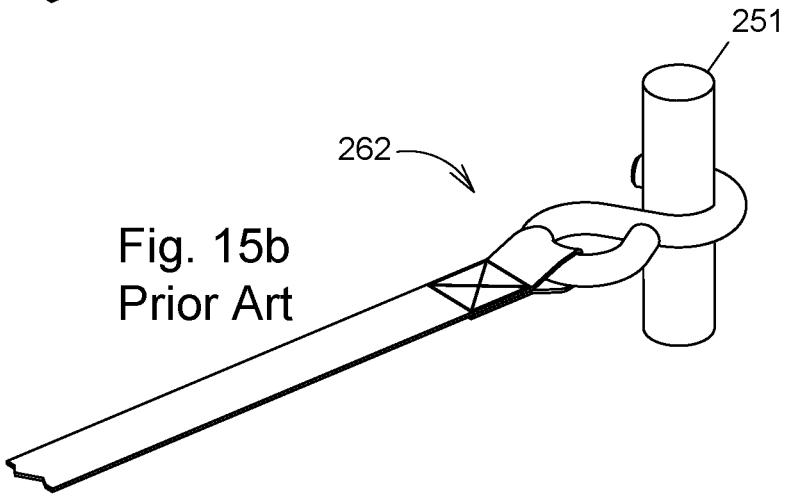
Figure 15C:
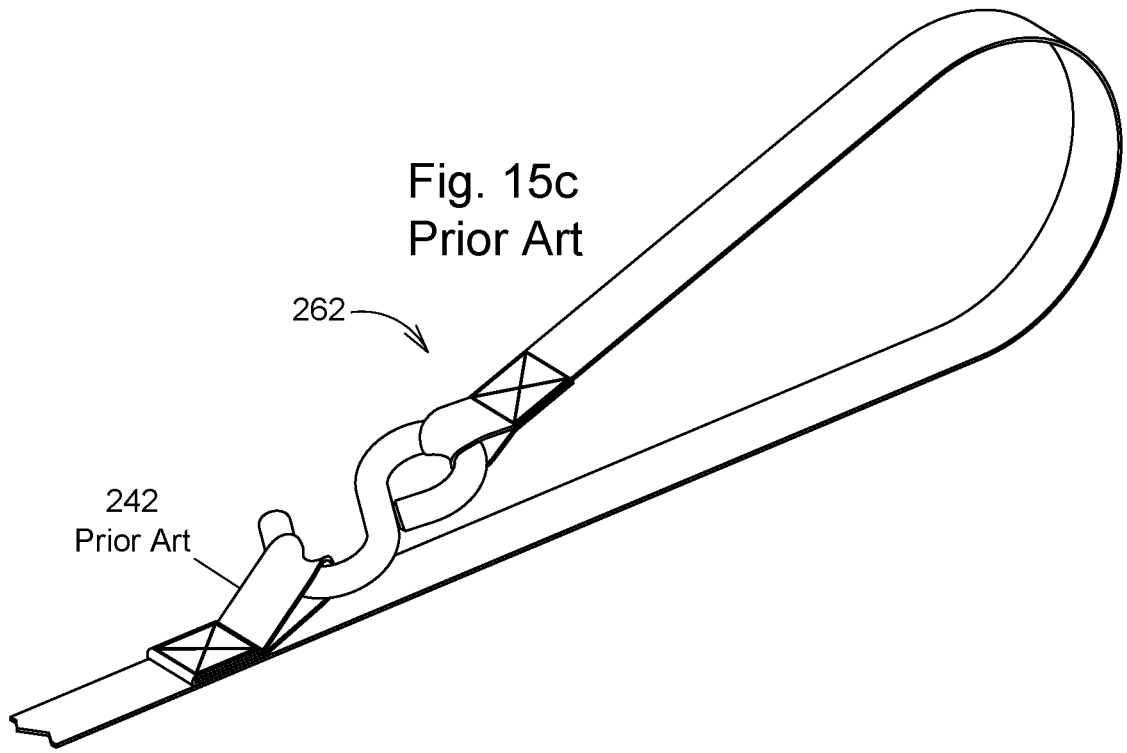
Figure 16A:
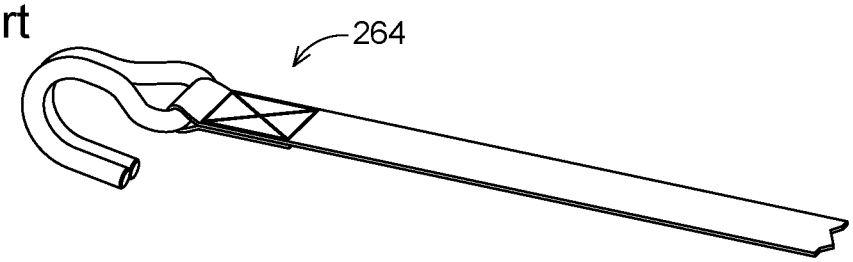
FIGS. 16a-16c Prior Art, show isometric views depicting a J-Hook strap, a J-Hook strap with the J-hook secured to a round bar section, and a J-Hook strap with the J-hook secured to a D-ring sewn onto the strap.
Figure 16B:
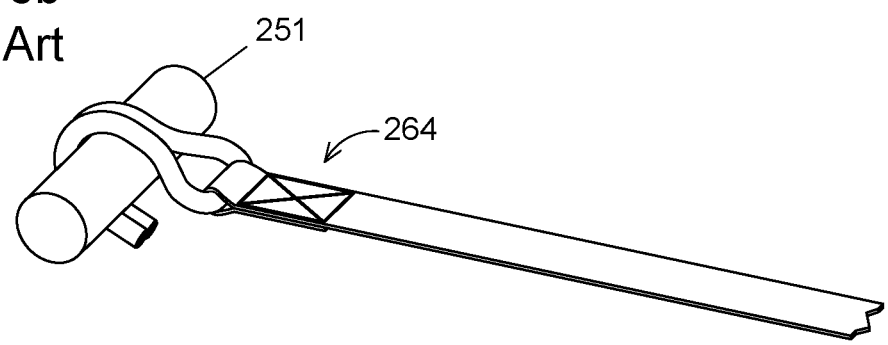
Figure 16C:
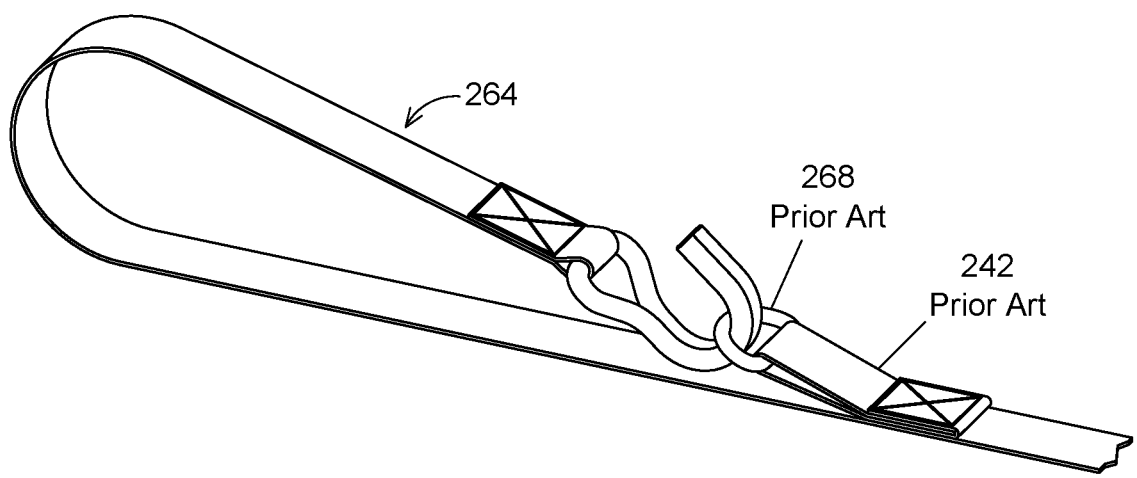
Figure 17:
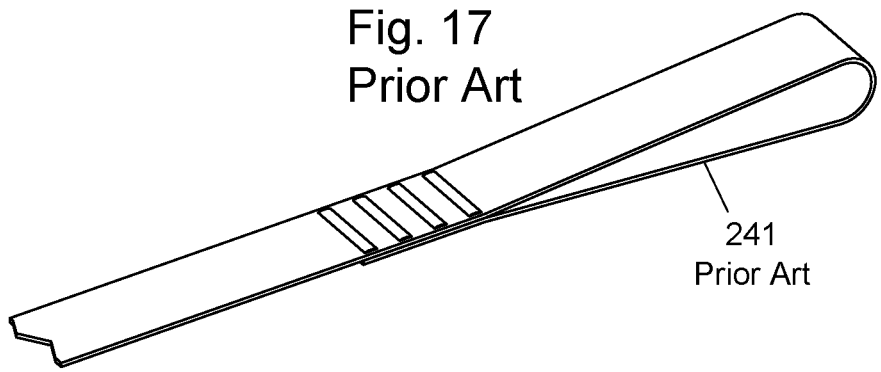
FIG. 17 Prior Art, shows an isomeric view depicting a loop sewn at the end of a strap.
Figure 19:
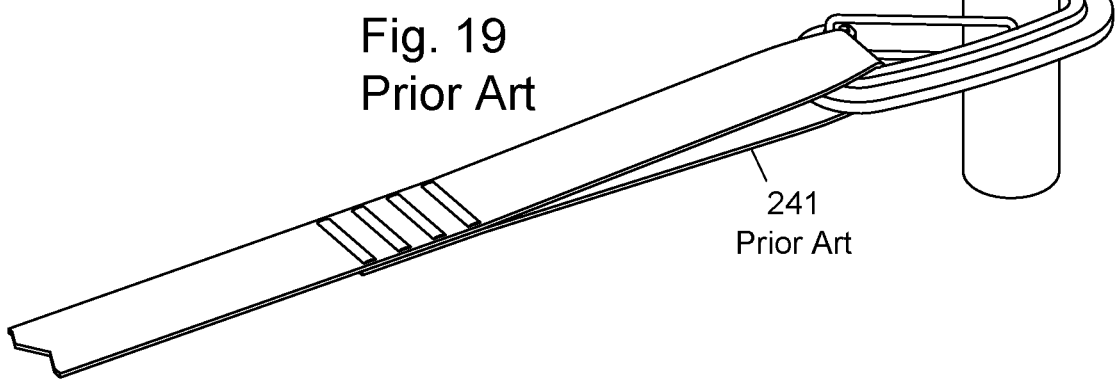
FIG. 19 Prior Art, shows an isometric view depicting a carabiner secured to both a round bar section, and the loop sewn at the end of a strap from FIG. 17. (Note, the locking gate of the carabiner is shown held open by the round bar section, highlighting the smaller anchor capacity of a typical carabiner when compared to an equivalent sized generic S-Hook.)

FIG. 9*a* through 9*d* shows a sequence of isometric views depicting a step wise progression of a strap being routed around a large diameter fixed anchor 252 where the hooks of the attachment device 100 attach along the length of the strap 240. The attachment device 100 is secured to a loop sewn at the end of the strap 241. Neither a supplemental loop 242 sewn to the strap or a secondary D-ring 268 sewn to the strap (FIG. 15*c*, FIG. 16*c*) are required to ensure a reliable hook-to-strap connection. The hook closure around the strap completely encircles the strap by means of the overlapping hooks. The symmetry in the overlapping hooks also minimizes concerns about uneven applied loading, particularly in comparison with the asymmetrical design of a carabiner/carabiner locking gate (FIG. 19).

Figure 7D:
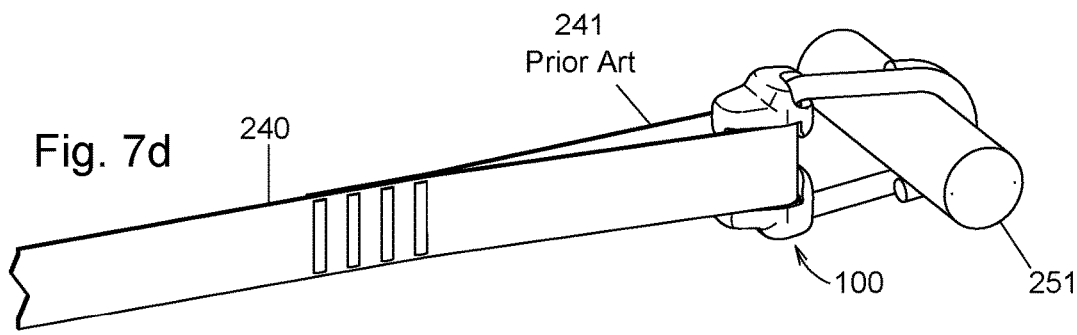
Figure 8A:
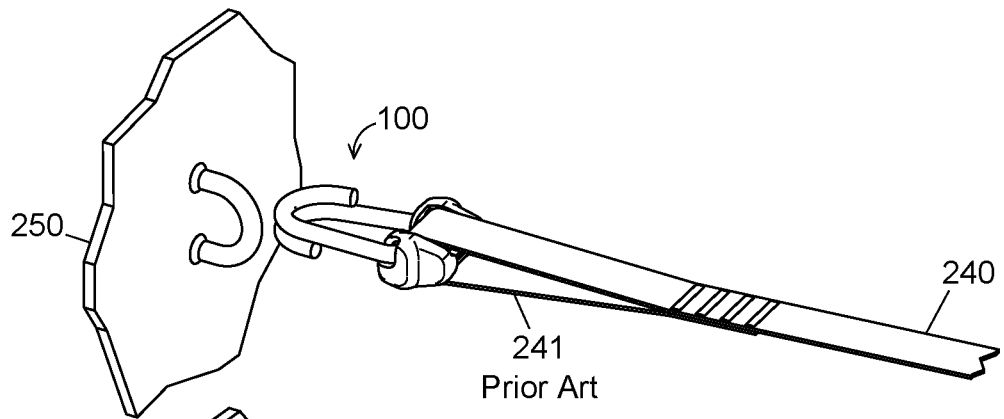
FIGS. 8a-8d shows a sequence of isometric views depicting a step wise progression of the attachment device of FIG. 1 connecting to a metal loop anchor, with the attachment device secured to a loop sewn at the end of a strap.
Figure 8B:
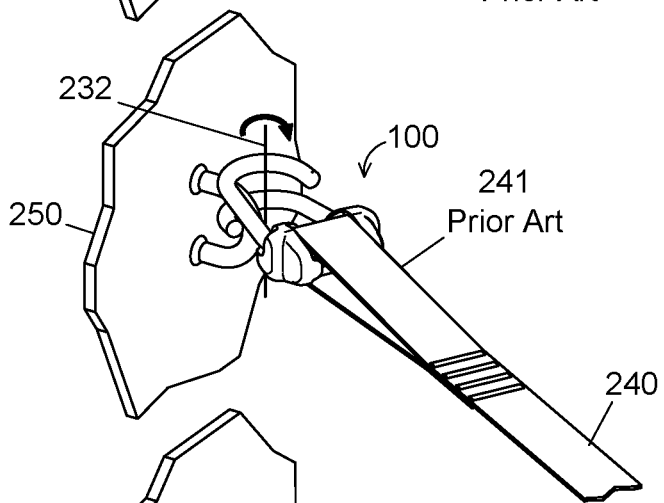
Figure 8C:
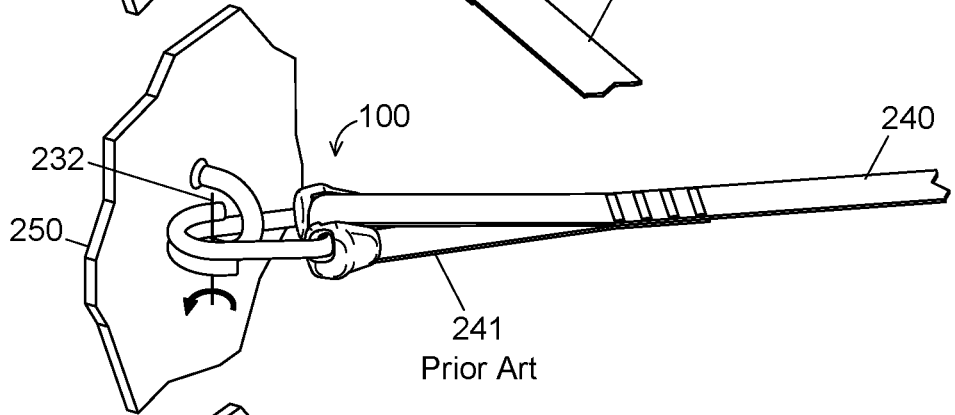
Figure 8D:
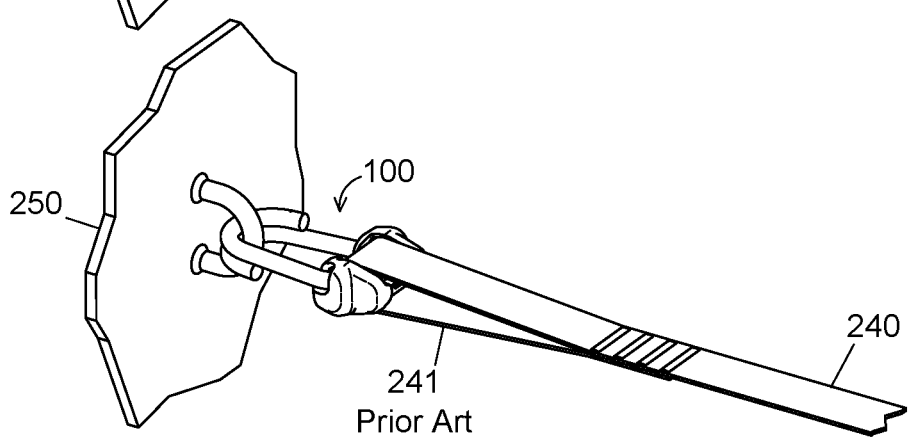
Figure 9A:
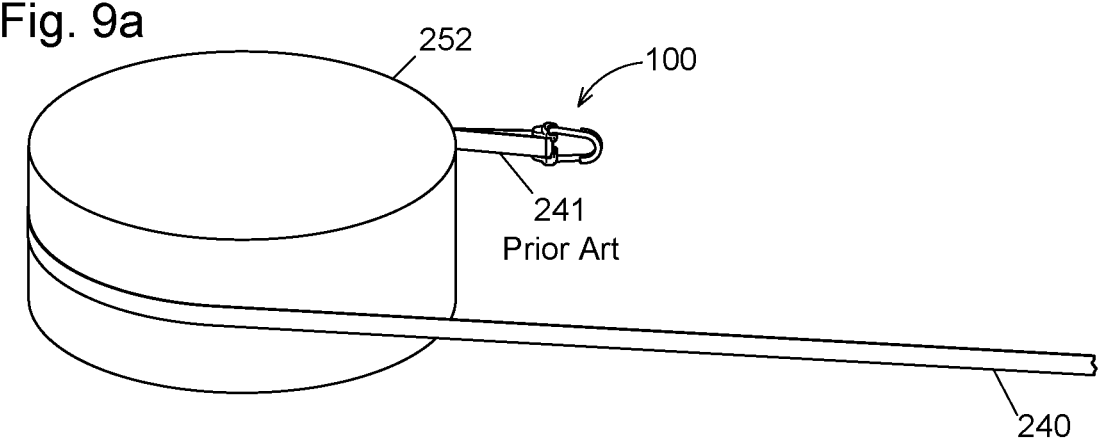
FIGS. 9a-9d shows a sequence of isometric views depicting a step wise progression of a strap being routed around a large diameter fixed anchor where hooks of the attachment device of FIG. 1, attach to the strap along its length. The attachment device is secured to a loop sewn at the end of the strap.
Figure 9B:
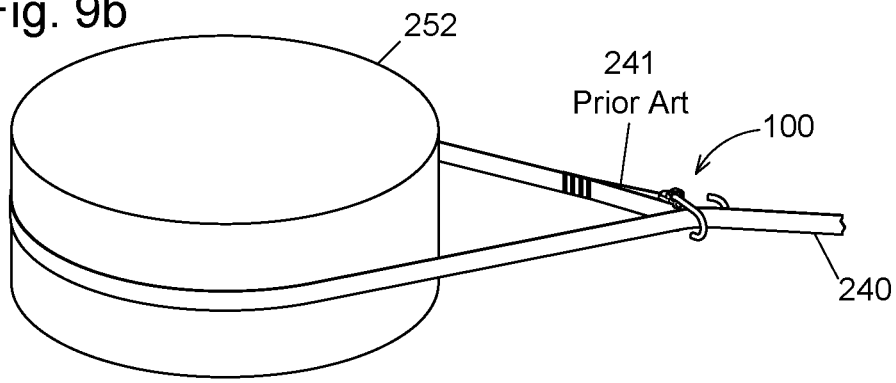
Figure 9C:
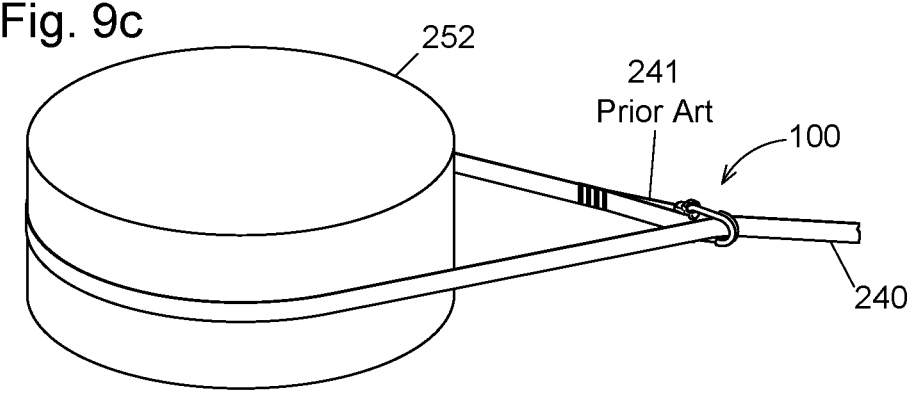
Figure 9D:
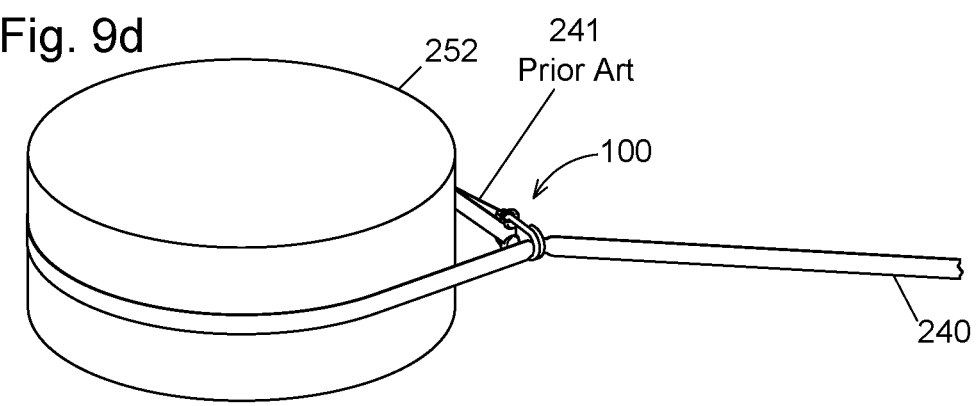
Figure 11A:
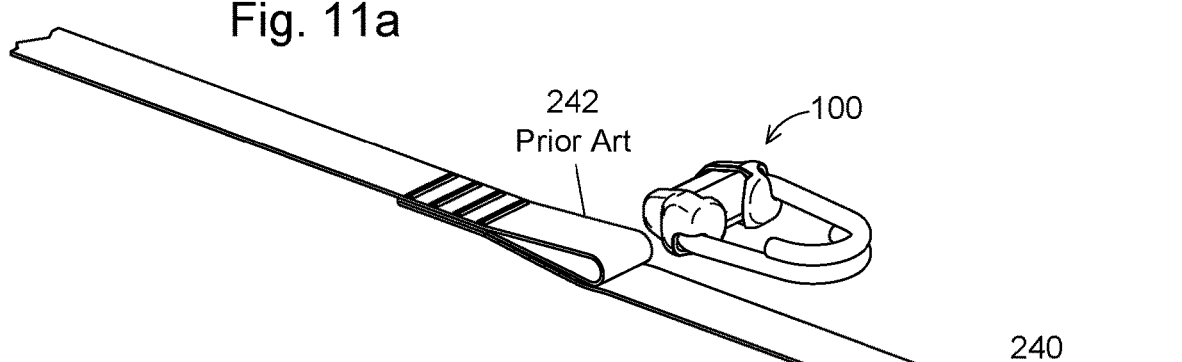
FIGS. 11a-11d show a sequence of isometric views depicting a step wise progression attaching the attachment device of FIG. 1 to a sewn loop positioned along a strap.
Figure 11B:
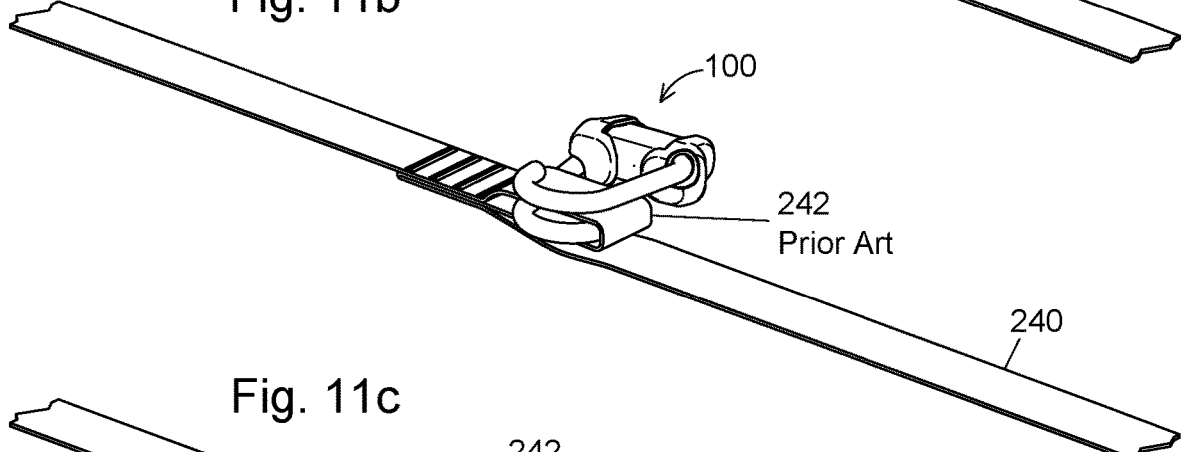
Figure 11C:
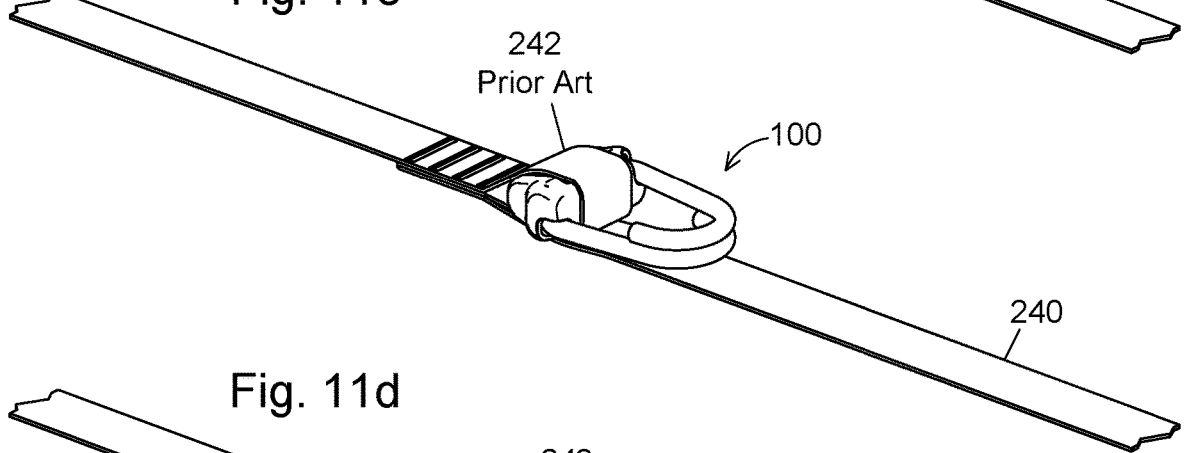
Figure 11D:
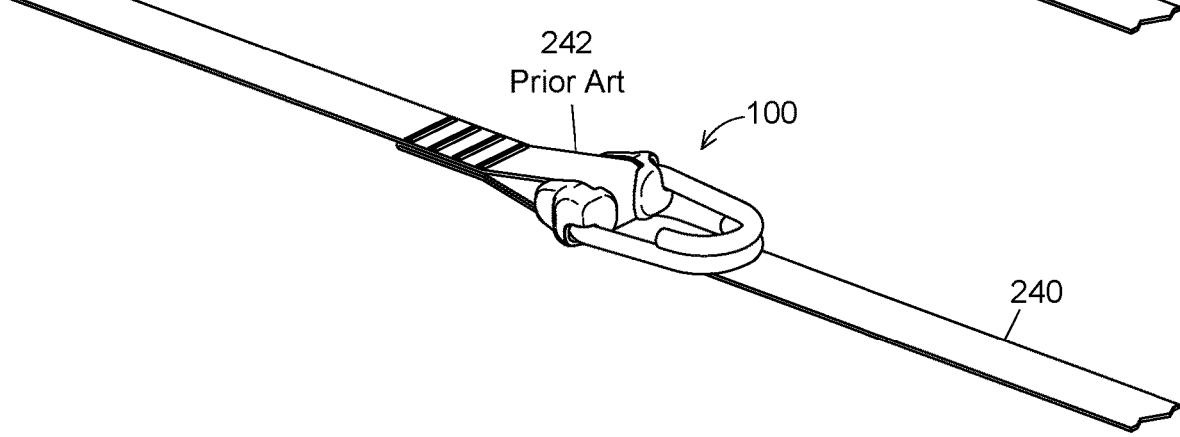

FIG. 10*a* through FIG. 10*c* illustrate utilizing the attachment device 100 as a static pulley. The attachment device 100 can be secured to a fixed anchor 250 without the strap first being secured to the attachment device. The end of the strap 240 can then be introduced to the attachment device 100 by threading the free end of a strap directly into the gaps 196 existing between the housing 130 and the end cap overhangs 198. Once the strap 240 has been configured as described, the strap can be drawn through the attachment device where the housing 130 now serves as a static pulley for the strap. Per FIG. 14, a generic camlock device 260 Prior Art utilizing a single strap can be configured in a manner similar to the fixed-end configurations previously described (FIG. 7*d*, FIG. 8*d*). Because the housing 130 of the attachment device 100 lacks any type of conformal coating, the strap 240 under tension can be drawn over the housing, without the housing or the strap suffering adverse effects.

ALTERNATIVE EMBODIMENTS

Figure 12A:
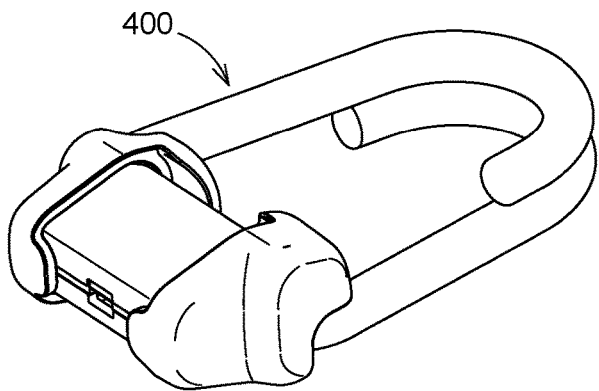
Figure 12B:
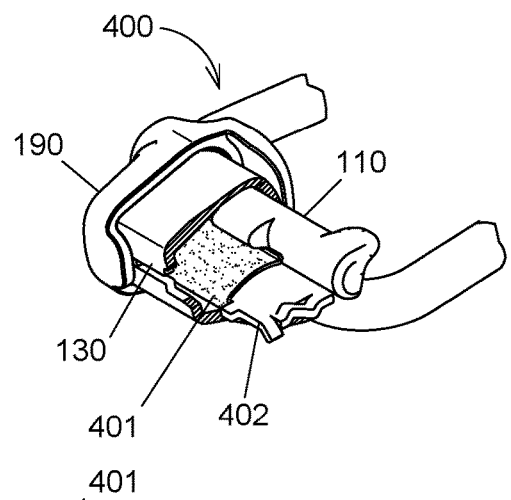
Figure 12C:
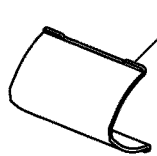
Figure 13A:
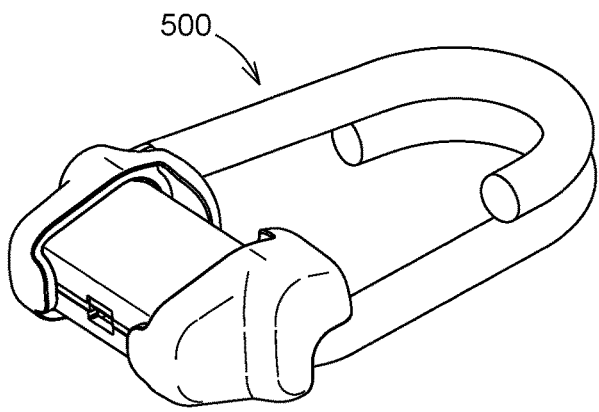
Figure 13B:
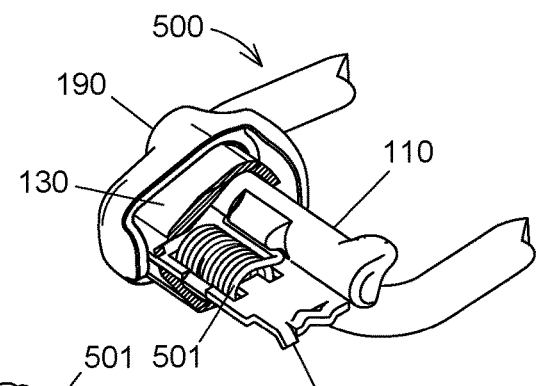
Figure 13C:

Two alternative embodiments 400, 500 are shown in FIG. 12 and FIG. 13 respectively. These alternative embodiments differ from the attachment device 100 by replacing the two flat springs 170 in the attachment device 100 with a U-shaped spring 401 shown in FIG. 12, or a torsion spring 501 shown in FIG. 13. Of primary importance in many of the embodiments is for the spring action of either the flat springs 190, the U-shaped spring 401, or the torsion spring 501 to adequately bias the two hooks 110 toward a closed position 211. Additionally, the center wall 150 in the attachment device 100 is replaced with an appropriately modified center wall 402, 502 in each of the alternative embodiments 400, 500 to accommodate the specific spring geometries in each of the respective alternative embodiments.

The attachment device 100, and the two alternative embodiments 400, 500, function equivalently in terms of hook action, and in how the embodiments attach to and release from a fixed anchor location.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. An attachment device comprising:
    a first hook and a second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook, wherein the first and second hook rotate between the first and second position;
    a housing, the housing interconnecting the first and second hook and providing a mechanism for a biasing force, the biasing force biasing the first and second hook towards each other;
    a first spring located in the housing, the first spring providing the biasing force;
    a center wall, the center wall located in the housing, the first spring pressing against the housing and the first hook in order to bias the first hook;
    a second spring located in the housing, the second spring pressing against the housing and the second hook in order to bias the second hook, wherein the first hook has a first opening and the second hook has a second opening and the first hook has a straight base and the second hook has a straight base, a portion of each of the first and second hook have a j-shape and in the second position the first and second hook lie flat on each other such that the j-shape of the first hook is superimposed over the j-shape of the second hook and the first opening is open in an opposite direction from the second opening, the housing includes a gap, the gap sized for receiving and securing a flat strap, the first hook includes a first bottom leg, the first bottom leg in the housing and the second hook includes a second bottom leg, the second bottom leg in the housing, the first and second bottom leg are each a straight leg that opposes the first and second curved end respectively, the first bottom leg includes a first central swage, the first central swage oriented to press against the first spring to create the biasing force respective to the first hook, the second bottom leg includes a second central swage, the second central swage oriented to press against the second spring to create the biasing force respective to the second hook, the first and second spring are flat springs.

2. The attachment device of claim 1, wherein the first and second hook lie flat against each other in the second position, such that first curved end is aligned with the second curved end and the first opening is open in an opposite direction from the second opening.

3. The attachment device of claim 1, wherein the first bottom leg includes a third swage and the second bottom leg includes a fourth swage, the third swage in a first notch in the housing, the first notch limiting the rotation of the first hook and the fourth swage in a second notch in the housing, the second notch limiting the rotation of the second hook.

4. The attachment device of claim 1, wherein the first and second hook rotate about the first and second bottom leg respectively between the first and second position.

5. A method of operating an attachment device, the method comprising:
    providing an attachment device including a first hook and a second hook, the first and second hook biased towards each other and interconnected with each other, such the first and second hook have a first position, where a first curved end of the first hook does not touch a second curved end of the second hook and a second position, where the first curved end of the first hook does touch the second curved end of the second hook;
    pushing the first and second curved end, in the second position, against a connection point;
    flexing the first and second curved end into the first position via the pushing;
    twisting the attachment device to release return the first and second hook to the second position.

6. The method of claim 5, wherein the first hook has a first opening and the second hook has a second opening and the first hook has a straight base and the second hook has a straight base and a portion the first and second hook have a j-shape and in the second position the first and second hook lie flat on each other such that the j-shape of the first hook is superimposed over the j-shape of the second hook and the first opening is open in an opposite direction from the second opening.

* * * * *